United States Patent [19]
Tran et al.

[11] Patent Number: 6,065,103
[45] Date of Patent: May 16, 2000

[54] SPECULATIVE STORE BUFFER

[75] Inventors: Thang M. Tran; Rupaka Mahalingaiah, both of Austin, Tex.

[73] Assignee: Advanced Micro Devices, Inc., Sunnyvale, Calif.

[21] Appl. No.: 08/991,915

[22] Filed: Dec. 16, 1997

[51] Int. Cl.[7] .................................................. G06F 12/00
[52] U.S. Cl. ......................... 711/156; 711/117; 711/154; 712/23; 712/216
[58] Field of Search .................................... 711/213, 204, 711/117, 156, 154; 712/218, 207, 23, 216

[56] References Cited

U.S. PATENT DOCUMENTS

| | | | |
|---|---|---|---|
| 5,535,346 | 7/1996 | Thomas, Jr. . | |
| 5,721,855 | 2/1998 | Hinton et al. | 712/218 |
| 5,751,983 | 5/1998 | Abramson et al. | 712/216 |
| 5,765,016 | 6/1998 | Walker | 712/23 |
| 5,802,588 | 9/1998 | Ramagopal et al. | 711/156 |
| 5,838,943 | 11/1998 | Ramagopal et al. | 712/218 |
| 5,878,245 | 3/1999 | Johnson et al. | 711/154 |
| 5,907,860 | 5/1999 | Garibay, Jr. et al. | 711/117 |

OTHER PUBLICATIONS

"Computer Architecture: A quantitative Approach", Hennessy and Patterson, Morgan Kaufman Publishers, Inc., 1990, p. 288.

*Primary Examiner*—Do Hyun Yoo
*Assistant Examiner*—Nasser Moazzami
*Attorney, Agent, or Firm*—Conley, Rose & Tayon, P.C.; Lawrence J. Merkel

[57] ABSTRACT

A speculative store buffer is speculatively updated in response to speculative store memory operations buffered by a load/store unit in a microprocessor. Instead of performing dependency checking for load memory operations among the store memory operations buffered by the load/store unit, the load/store unit may perform a lookup in the speculative store buffer. If a hit is detected in the speculative store buffer, the speculative state of the memory location is forwarded from the speculative store buffer. The speculative state corresponds to the most recent speculative store memory operation, even if multiple speculative store memory operations are buffered by the load/store unit. Since dependency checking against the memory operation buffers is not performed, the dependency checking limitations as to the size of these buffers may be eliminated. The speed at which dependency checking can be performed may in large part be determined by the number of storage locations within the speculative store buffer (as opposed to the number of memory operations which may be buffered in the memory operation buffers or buffers).

18 Claims, 8 Drawing Sheets

SPECULATIVE STORE BUFFER

BACKGROUND OF THE INVENTION

1. Field of the Invention

This invention relates to the field of microprocessors and, more particularly, to load/store dependency checking within microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Superscalar microprocessors demand high memory bandwidth (and more particularly low memory latency) due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modem DRAMs are significantly longer than the clock cycle length of modem microprocessors. The memory access time for each set of bytes being transferred to the microprocessor is therefore long. Accordingly, the main memory system is not a high bandwidth, low latency system. Microprocessor performance may suffer due to a lack of available memory bandwidth and the long latency.

In order to allow high bandwidth, low latency memory access (thereby increasing the instruction execution efficiency and ultimately microprocessor performance), microprocessors typically employ one or more caches to store the most recently accessed data and instructions. A relatively small number of clock cycles may be required to access data stored in a cache, as opposed to a relatively larger number of clock cycles required to access the main memory.

Unfortunately, the number of clock cycles required for cache access is increasing in modern microprocessors. Where previously a cache latency (i.e. the time from initiating an access to the corresponding data becoming available for execution) might have been as low as one clock cycle, cache latencies in modem microprocessors may be two or even three clock cycles. A variety of delay sources are responsible for the increased cache latency. As transistor geometries characteristic of modern semiconductor fabrication technologies have decreased, interconnect delay has begun to dominate the delay experienced by circuitry upon on integrated circuit such as a microprocessor. Such interconnect delay may be particularly troubling within a large memory array such as a cache. Additionally, semiconductor fabrication technology improvements have enabled the inclusion of increasing numbers of functional units (e.g. units configured to execute at least a subset of the instructions within the instruction set employed by the microprocessor). While the added functional units increase the number of instructions which may be executed during a given clock cycle, the added functional units accordingly increase the bandwidth demands upon the data cache. Still further, the interconnect delay between the data cache and the functional units increases with the addition of more functional units (both in terms of length of the interconnect and in the capacitive load thereon).

Instructions awaiting memory operands from the data cache are stalled throughout the cache latency period. Generally, an instruction operates upon operands specified by the instruction. An operand may be stored in a register (register operand) or a memory location (memory operand). Memory operands are specified via a corresponding address, and a memory operation is performed to retrieve or store the memory operand. Overall instruction throughput may be reduced due to the increasing cache latency experienced by these memory operations. The x86 microprocessor architecture is particularly susceptible to cache latency increase, since relatively few registers are available. Accordingly, many operands in x86 instruction code sequences are memory operands. Other microprocessor architectures are deleteriously affected as well.

Generally, registers and memory (or memory locations) are different types of storage locations. Registers are private to the microprocessor (i.e. cannot be directly accessed by other devices in the computer system besides the microprocessor). Memory is generally accessible to many devices in a computer system. Registers are typically identified directly by a field in an instruction, while memory locations are identified by an address which is generated from instruction operands (e.g. by adding the instruction operands).

The size of buffers (such as reservation stations and the load/store buffer for storing memory operand requests, or memory operations) may be increased to offset the delay in fetching memory operands. With increased the buffer sizes, the microprocessor may be able to execute instructions which are subsequent to instructions stalled awaiting memory operands (i.e. the microprocessor may have an increased ability to detect parallelism in instruction code being executed). Unfortunately, increased buffer size poses problems as well. Particularly, the load/store buffer generally performs dependency checking upon memory accesses to the data cache, to ensure that a prior store memory operation within the buffer is not bypassed by a subsequent load memory operation. Not only do a large number of comparisons need to be made, but then a large amount of logic is often needed to prioritize the comparison results when multiple dependencies are detected. As the number of buffer entries increases, this logic becomes more complex and requires even more time to evaluate. A method for rapidly performing dependency checking in a load/store buffer is therefore desired.

SUMMARY OF THE INVENTION

The problems outlined above are in large part solved by a speculative store buffer in accordance with the present invention. The speculative store buffer is speculatively updated in response to speculative store memory operations buffered by a load/store unit in a microprocessor. Instead of performing dependency checking for load memory operations among the store memory operations buffered by the load/store unit, the load/store unit may perform a lookup in the speculative store buffer. If a hit is detected in the speculative store buffer, the speculative state of the memory location is forwarded from the speculative store buffer. The speculative state corresponds to the most recent speculative store memory operation, even if multiple speculative store memory operations are buffered by the load/store unit. Advantageously, at most one hit may be detected in the speculative store buffer. Complex hit prioritization logic may thereby be eliminated. Dependency checking may be performed more rapidly, which may allow for a higher frequency (shorter clock cycle) implementation to be developed.

Since dependency checking against the memory operation buffers is not performed, the dependency checking limitations as to the size of these buffers may be eliminated. Therefore, the memory operation buffers may be made larger. The speed at which dependency checking can be performed may in large part be determined by the number of storage locations within the speculative store buffer (as opposed to the number of memory operations which may be buffered in the memory operation buffers or buffers). Therefore, a relatively small speculative store buffer may be coupled with a relatively large memory operation buffer or buffers to provide for higher performance (by allowing increased visibility to the parallelism within a code sequence) while maintaining correct dependency checking (via the speculative store buffer).

Broadly speaking, the present invention contemplates a method for performing, memory operations in a microprocessor. At least a first data address corresponding to a first store memory operation is stored in a speculative store buffer. The first store memory operation may be speculative upon storing the first data address. The first store memory operation is also stored in a buffer for subsequent update to a data cache. The speculative store buffer is accessed in response to a first load memory operation which is subsequent to the first store memory operation in program order. A value corresponding to the first store memory operation is forwarded from the speculative store buffer if a second data address corresponding to the first load memory operation matches the first data address.

The present invention further contemplates a load/store unit comprising a speculative store buffer coupled to a control unit. The speculative store buffer is configured to store a speculative state of a memory location. The control unit is configured to establish the speculative state in response to a first speculative store memory operation to the memory location. Additionally, the control unit is configured to update the speculative state of the memory location in response to a second speculative store memory operation to the memory location.

Moreover, the present invention contemplates a microprocessor comprising a load/store unit and a data cache. The load/store unit includes a speculative store buffer configured to store a speculative state of at least one memory location. The load/store unit is configured to establish the speculative state in response to a first store memory operation to the at least one memory location. Furthermore, the load/store unit is configured to update the speculative state in response to a second store memory operation to the at least one memory location. The speculative store buffer is configured to forward the speculative state in response to a load memory operation to the at least one memory location. Coupled to the load/store unit, the data cache is configured to store a non-speculative state of the at least one memory location. Additionally, the data cache is further configured to forward the non-speculative state in response to the load memory operation if the speculative store buffer is not storing a speculative state corresponding, to the load memory operation.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
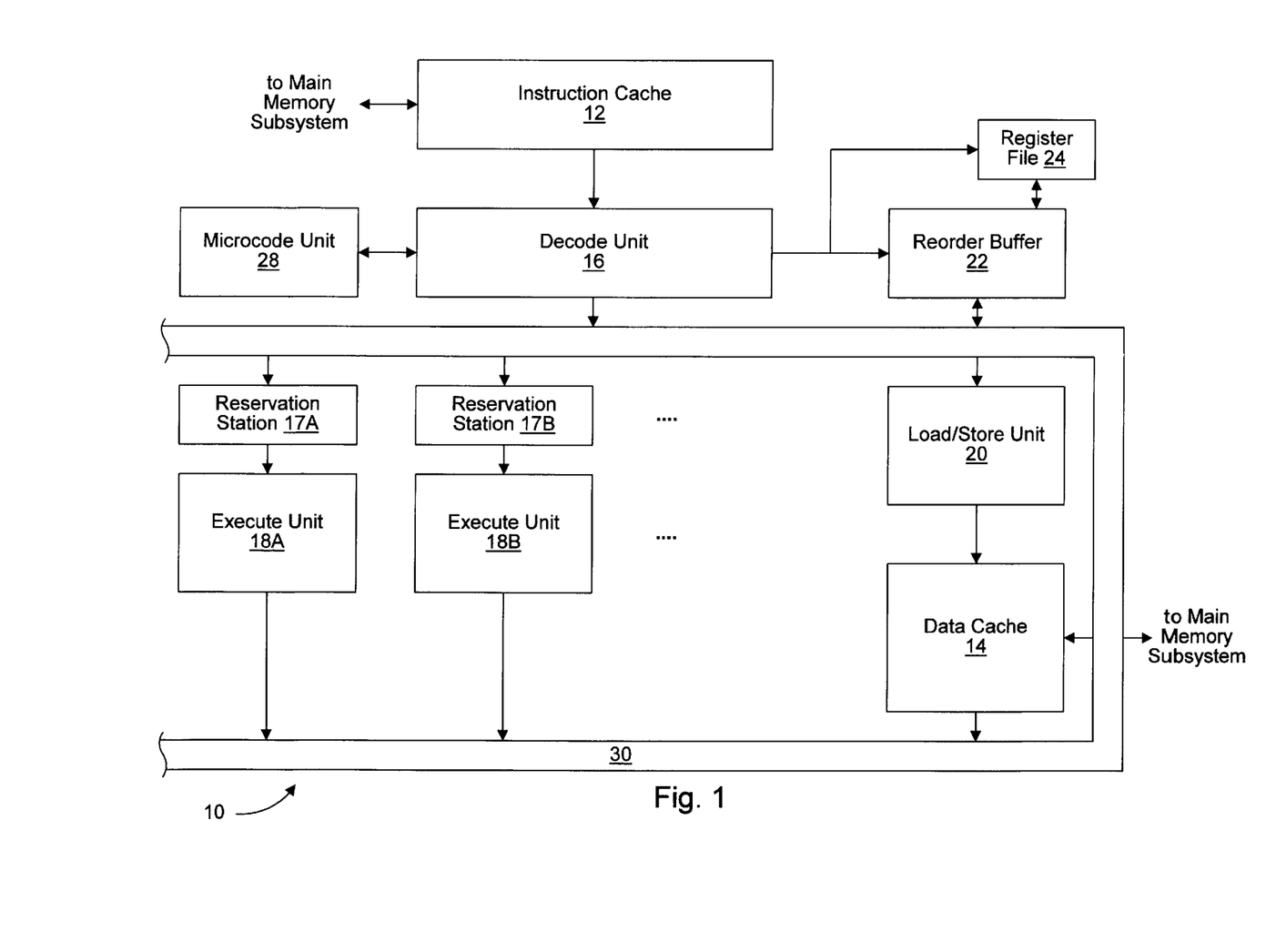
FIG. 1 is a block diagram of one embodiment of a microprocessor.

Turning now to FIG. 1, a block diagram of one embodiment of a microprocessor is shown. Other embodiments are possible and contemplated. Microprocessor 10 includes an instruction cache 12, a data cache 14, a decode unit 16, a plurality of reservation stations including reservation stations 17A–17B, a plurality of execute units including execute units 18A–18B, a load/store unit 20, a reorder buffer 22, a register file 24, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, load/store unit 20, reorder buffer 22, register file 24, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B. Each reservation station 17 is coupled to receive operand information from reorder buffer 22. Load/store unit 20 is coupled to data cache 14, which is further coupled to the main memory subsystem.

Generally speaking, load/store unit 20 includes a load/store buffer for storing memory operations corresponding to instructions. Memory operations are dispatched by decode unit 16 into the load/store buffer. Subsequently, the address operands (operands used to generate the address of the memory operand) become available and the address of the memory operation is generated. In one embodiment, execute units 18A–18B generate the address and forward the address to load/store unit 20. In another embodiment, load/store unit 20 may be configured to generate the address.

Load/store unit 20 further includes a speculative store buffer. The speculative store buffer is configured to store a speculative state of one or more memory locations. As used herein, the "speculative state" of a memory location is the state of the memory location subsequent to the execution of one or more speculative store memory operations. A particular instruction may be speculative if one or more branch instructions prior to the particular instruction in program order have not yet been executed (and therefore the predicted direction(s) of the branch instruction(s), which lead to fetching of the particular instruction, have not been verified). Additionally, the particular instruction may be speculative if one or more instructions prior to the particular instruction in program order may cause an exception. The term "program order" refers to the order of instructions as listed in the program being executed.

By maintaining the speculative state of memory locations within the speculative store buffer, the effect of multiple stores on a memory location may be visible via a single entry. Dependency checking for load memory operations therefore becomes a lookup into the speculative store buffer. If the address of the load memory operation hits in the speculative store buffer, the speculative state of the memory location is forwarded by the speculative store buffer. Otherwise, a data cache access is performed for the memory operation. Data cache 14 stores the non-speculative state of a memory operation. Advantageously, an arbitrarily large load/store buffer may be employed without affecting the dependency checking timing.

It is noted that store memory operations may be speculatively performed to the speculative store buffer, but the store memory operations may remain in the load/store buffer for subsequent updating to data cache 14 after the store memory operations become non-speculative. In this manner, if a speculative store memory operation is cancelled (e.g. due to branch misprediction or exception), data cache 14 has not yet been updated. The contents of the speculative store buffer may be invalidated (as any non-speculative store memory operations update data cache 14). Recovery from an incorrect speculative state may thereby be performed.

As used herein, the term "address" refers to a value which identifies one or more bytes of information stored in the main memory. The address may be virtual, in which a translation defines the corresponding physical address actually presented to main memory. A fetch address is an address used to fetch instruction bytes (e.g. from instruction cache 12 or from main memory, in the event of a miss). A data address is an address used to fetch data (e.g. memory operands for instructions). Furthermore, instruction cache 12 and data cache 14 may be physically addressed and tagged (in which a translation of the address from virtual to physical is performed prior to or in parallel with cache access) or virtually addressed and tagged, according to design choice.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 and/or load/store unit 20 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 and/or to load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Generally speaking, the "context" of a program comprises the state needed to correctly run that program. Register values created by the program are included in the context, as are the values stored in any memory locations used by the program. Microcode unit 28 causes the context stored within microprocessor 10 to be saved to memory at a predefined memory location (according to the microprocessor architecture employed by microprocessor 10) and restores the context of the program being initiated. Context switches may occur in response to an interrupt being signalled to microprocessor 10, for example.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and microprocessor 10. A load memory operation specifies the transfer of data from one or more memory locations within the main memory to microprocessor 10. On the other hand, a store memory operation specifies the transfer of data from microprocessor 10 to one or more memory locations within the main memory. The memory location or locations accessed by a given memory operation are identified within the main memory by an address corresponding to the given memory operation.

Reservation stations 17 are configured to store instructions whose operands haste not yet been provided. An instruction is selected from those stored in a reservation station 17A–17B for execution if: (1) the operands of the instruction have been provided, and (2) the instructions within the reservation station 17A–17B which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17B which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction or memory operation, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration. Data cache 14 allocates and deallocates storage for data in cache lines. A cache line is a block of contiguous bytes. The byte within the cache line which has the lowest numerical address is stored at an address which is aligned to a cache line boundary.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 2:
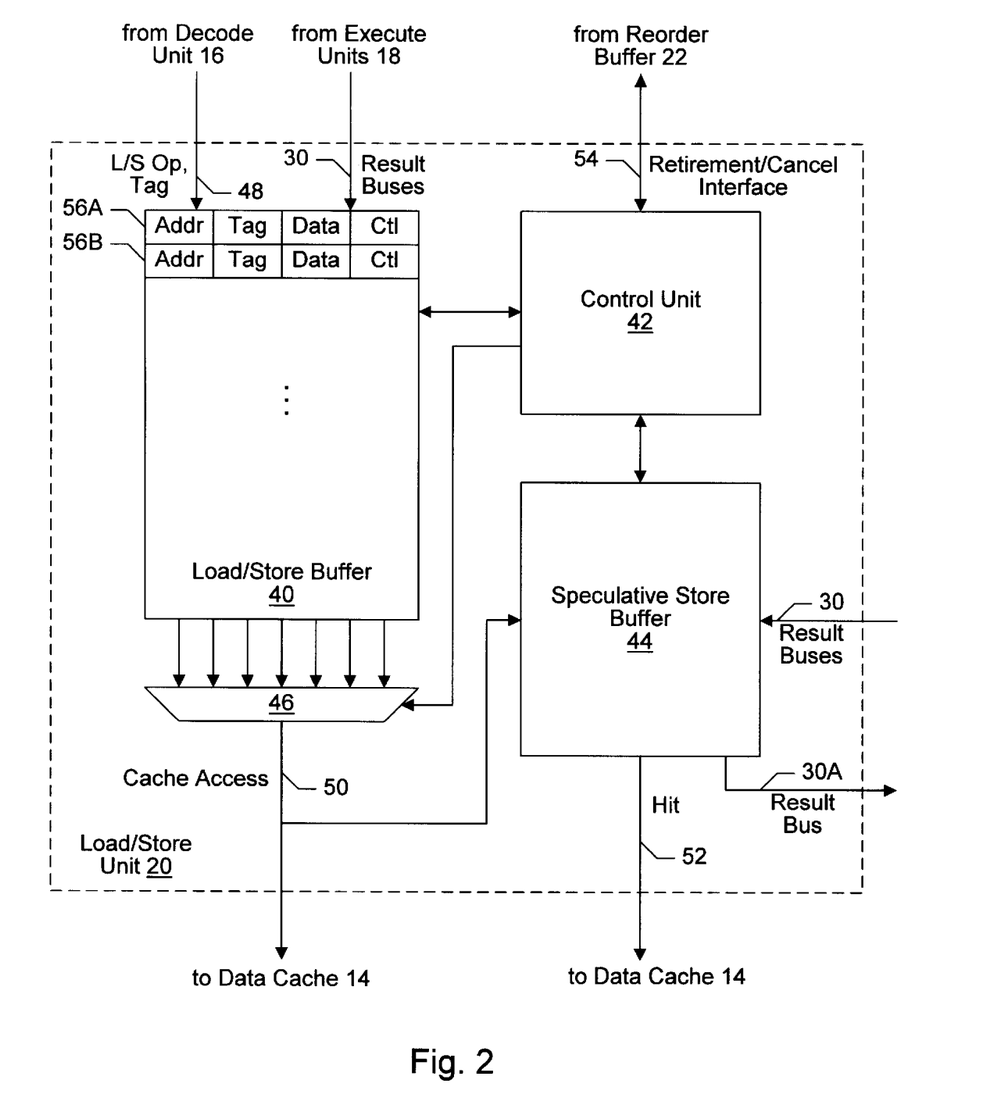
FIG. 2 is a block diagram of one embodiment of a load/store unit shown in FIG. 1.

Turning now to FIG. 2, a block diagram of one embodiment of load/store unit 20 is shown. Other embodiments are possible and contemplated. In the embodiment of FIG. 2, load/store unit 20 includes a load/store buffer 40, a control unit 42, a speculative store buffer 44, and a multiplexor 46. Load/store buffer 40 is coupled to an L/S op and tag bus 48 from decode unit 16, and is further coupled to result buses 30 from execute units 18. Additionally, load/store buffer 40 is coupled to control unit 42 and multiplexor 46. Multiplexor 46 receives selection controls from control unit 42, and is coupled to a cache access bus 50 to data cache 14. Cache access bus 50 is further coupled to speculative store buffer 44. Additionally, speculative store buffer 44 is coupled to control unit 42, result buses 30 and a result bus 30A. Furthermore, speculative store buffer 44 is coupled to a hit line 52 to data cache 14. Still further, control unit 42 is coupled to a retirement/cancel interface 54 from reorder buffer 22.

Speculative store buffer 44 is used to store the speculative state of one or more memory locations. Speculative store buffer 44 may be updated with addresses and corresponding data (or reorder buffer tags identifying the data) for speculative store memory operations within load/store buffer 40. If the speculative store memory operation hits in speculative store buffer 44, the speculative state of the memory location corresponding to the speculative store memory operation is updated into the hitting storage location within speculative store buffer 44. On the other hand, if a speculative store memory operation misses in speculative store buffer 44, a storage location within speculative store buffer 44 is allocated for storing the corresponding speculative state. Control unit 42 may be configured to allocate the storage location upon a speculative store buffer miss and to control the updated thereof upon subsequent store buffer hits. Subsequent load memory operations may access speculative store buffer 44 and detect a hit if the subsequent load memory operations are dependent upon a speculative store memory operation. Advantageously, even if multiple speculative store memory operations are performed to a memory location, only one hit is detected in speculative store buffer 44. Dependency checking is therefore eliminated in favor of a look up in speculative store buffer 44.

Load/store buffer 40 includes a plurality of entries (e.g. entries 56A–56B). Each entry 56 is configured to store a memory operation, and may include an address field (Addr), tag field (Tag), data field (Data) and control field (Ctl). The address field is used to store the address of the memory operation. The tag field is used to store the reorder buffer tag corresponding to the memory operation (for conveyance upon the result buses when the memory operation is performed, e.g., for forwarding memory operation results). The data field is used for store memory operations to store the data to be written to the memory location addressed by the store memory operation. Finally, the control field is used to store various control information. The control field includes an indication of whether the memory operation is a load or a store. Additionally, the control field may include valid bits for the address and data fields, as well as a valid bit for the entry as a whole (i.e. indicating whether or not a memory operation is stored in the entry).

Decode unit 16 dispatches memory operations in response to instructions being decoded via L/S op and tag bus 48. A memory operation may be an instruction, or may be an implicit portion of an instruction executed by execute units 18 which accesses a memory operand, depending upon the microprocessor architecture employed by microprocessor 10. Decode unit 16 indicates, for each memory operation, the reorder buffer tag corresponding to the memory operation as well as whether or not the memory operation is a load or a store. Control unit 42 allocates a load/store buffer location for each memory operation, and stores the provided tag therein. The instruction corresponding to the memory operation is also dispatched to an execute unit 18, which performs the address generation for the memory operation (as well as other instruction operations, if the memory operation is an implicit portion of another instruction). Additionally, a tag corresponding to the store data of a store memory operation may be provided. Load/store buffer 40 may store the data tag in the corresponding control field.

Execute units 18 forward the address for the memory operation (as well as the corresponding reorder buffer tag) via result buses 30. Control unit 42 monitors result buses 30 to detect tags corresponding to memory operations (or store data) within load/store buffer 40, and causes load/store buffer 40 to capture the values when provided.

Additionally, control unit 42 selects memory operations for presentation to data cache 14 and speculative store buffer 44. Control unit 42 scans the entries 56 within load/store buffer 40 for memory operations which are ready for presentation to data cache 14 and/or speculative store buffer 44. A load memory operation may be ready for presentation to data cache 14 and speculative store buffer 44 if the corresponding address has been generated. A store memory operation may be ready for presentation to data cache 14 if the store is no longer speculative. Additionally, a store memory operation may be ready for presentation to speculative store buffer 44 if the corresponding address has been generated (even if the store memory operation is speculative). The corresponding store data need not have been received for a store memory operation to be ready for presentation to speculative store buffer 44. If a memory operation is detected which is ready for presentation, the memory operation is selected via multiplexor 46 and conveyed upon cache access bus 50 to data cache 14 and to speculative store buffer 44. The activities performed by data cache 14 and speculative store buffer 44 in response to the selected memory operation depend upon the type of memory operation: load memory operation, non-speculative store memory operation, or speculative store memory operation.

For load memory operations, if a hit in speculative store buffer 44 is detected, then speculative store buffer 44 conveys the speculative state of the memory location accessed by the load memory operation upon result bus 30A (along with the tag from the tag field of the entry 56 storing the load memory operation). The speculative state may comprise the data tag of a speculative store memory operation, if the data has not yet been provided. Alternatively, the speculative state may comprise the data corresponding to the speculative store memory operation. In the case of a data tag being conveyed, control unit 42 may also cause the forwarding of the corresponding data if the data is being simultaneously provided upon result buses 30. Otherwise, the receiving reservation station 17 and/or reorder buffer 32 monitors result buses 30 for the tag provided from speculative store buffer 44. Speculative store buffer 44 also indicates the hit to data cache 14 via hit line 52, such that data cache 14 may cancel the corresponding cache access. On the other hand, if a load memory operation misses speculative store buffer 44, then data cache 14 forwards the non-speculative state of the memory location accessed by the load memory operation (perhaps causing a main memory subsystem fetch, in the case of a data cache miss).

For non-speculative store memory operations, the store memory operation is conveyed to both speculative store buffer 44 and data cache 14. If the store memory operation has not previously accessed speculative store buffer 44 and speculative store buffer 44 detects a hit for the store memory operation, speculative store buffer 44 may update the hitting location with the store data (under the control of control unit 42). On the other hand, since data cache 14 is being updated with the store data as well, speculative store buffer 44 may invalidate the hitting location (under the control of control unit 42). If the non-speculative store memory operation has previously accessed speculative store buffer 44 (i.e. as a speculative memory operation), then speculative store buffer 44 may not be updated. A second store memory operation subsequent to the non-speculative store memory operation may have subsequently updated speculative store buffer 44. If the non-speculative store memory operation misses in speculative store buffer 44, then the store memory operation may simply update data cache 14. Since data cache 14 is being updated concurrently, it may be desirable not to allocate a speculative store buffer 44 storage location. It is noted that the control field of entries 56 may indicate whether or not a store memory operation has been previously conveyed to speculative store buffer 44.

For speculative store memory operations, the data cache access is automatically cancelled. Data cache 14 is used to store non-speculative states for memory locations, and therefore is not updated in response to speculative store memory operations. However, speculative store buffer 44 is updated in response to speculative store memory operations. If the speculative store memory operation is a hit in speculative store buffer 44, the corresponding location is updated with the store data (under the control of control unit 42). Alternatively, a store data tag (a reorder buffer tag which identifies the store data upon result buses 30) may be stored into store buffer 44. Control unit 42 may then monitor result buses 30 for the store data tag and cause speculative store buffer 44 to capture the corresponding store data. If the speculative store memory operation is a miss in speculative store buffer 44, control unit 42 allocates a storage location within speculative store buffer 44 for the memory location addressed by the speculative store memory operation. If speculative store buffer 44 is full (i.e. each of the storage locations is allocated to a different memory location), then the speculative store memory operation may be stalled.

It is noted that, since speculative store memory operations are not transmitted to data cache 14 when they update speculative store buffer 44, a separate communication channel may be established between speculative store buffer 44 and load/store buffer 40 for speculative store memory operations. Concurrent with updating speculative store buffer 44 with a speculative store memory operation, cache access bus 50 may be used for performing other memory operations. It is further noted that, since speculative store memory operations may eventually be transmitted to data cache 14 as non-speculative store memory operations, the control field of a speculative store memory operation may be updated to indicate that speculative store buffer 44 has recorded the store memory operation. Subsequently, when the store memory operation becomes non-speculative, speculative store buffer 44 may detect that the store memory operation has already been recorded therein.

In the present embodiment, control unit 42 discards load memory operations from load/store buffer 40 when they are performed (whether they hit in speculative store buffer 44 or data cache 14). Load memory operations which miss data cache 14 and speculative store buffer 44 may be speculatively cause a fetch from memory, or may be retained in load/store buffer 40 until they are non-speculative and then fetched from memory. Store memory operations are retained until they are non-speculative, even if the store memory operations have updated speculative store buffer 44. When the store memory operations become non-speculative, they may be selected by control unit 42 for presentation to data cache 14. Control unit 42 is configured to determine which store memory operations (and load memory operations which remain in load/store buffer 40) are non-speculative via retirement/cancel interface 54. Reorder buffer 22 indicates which store memory operations are ready to retire (and are therefore no longer speculative). For example, reorder buffer tags corresponding to store memory operations which are ready to retire may be conveyed to control unit 42. Control unit 42 may select the corresponding store memory operations for presentation to data cache 14, or may mark them as non-speculative via the corresponding control field and select them at a later time. Alternatively, reorder buffer 22 may signal that the oldest outstanding stores are ready for retirement. Control unit 42 may then select the oldest outstanding store memory operations from load/store buffer 42 for presentation to data cache 14 (or mark them as non-speculative, as indicated above).

Furthermore, reorder buffer 22 may communicate which speculative memory operations are to be cancelled via retirement/cancel interface 54. Again, reorder buffer tags of cancelled operations may be conveyed, or memory operations may be cancelled from the oldest forward. Any mechanism for indicating cancellation may be suitable.

In addition to discarding cancelled memory operations from load/store buffer 40, control unit 42 may invalidate speculative store buffer 44 in response to memory operation cancellation since speculative store buffer 44 may be storing speculative state corresponding to one or more of the cancelled memory operations. After the cancellation of the memory operations, remaining store memory operations (beginning with the store memory operations which are foremost, in program order) within load/store buffer 40 may be presented to speculative store buffer 44 to establish a speculative state consistent with the remaining store memory operations. For example, the indication with each of the control fields of entries 58 that indicates which store memory operations have been recorded in speculative store buffer 44 may be reset when one or more memory operations are cancelled. In this manner, the remaining speculative store memory operations may be selected to update speculative store buffer 44 again.

It is noted that, since speculative store buffer 44 is configured with a finite number of storage locations, a method for freeing a particular storage location when the memory location represented therein is no longer speculatively updated may be employed. In one embodiment, speculative store buffer 44 may be configured to store the reorder buffer tag corresponding to the most recent store memory operation to update a memory location in the corresponding speculative store buffer location. The most recent store memory operation is the last memory operation, in program order, to update the memory location. By comparing the stored reorder buffer tag to the reorder buffer tags of non-speculative store memory accesses conveyed upon cache access bus 50, speculative store buffer 44 may invalidate an entry corresponding to the non-speculative store memory access. The corresponding storage location within speculative store buffer 44 may then be freed for allocation to another memory location.

It is noted that control unit 42 may be configured to perform load/store memory operations out of program order.

In order to use speculative store buffer 44, a method may be employed for (i) ensuring that load memory operations do not bypass store memory operations upon which they depend; and (ii) that store memory operations do not update speculative store buffer 44 before prior load memory operations which access the memory location updated by the store memory operation have obtained the prior value from the memory location. For example, a load memory operation may be selected for out of order access if each previous store memory operation has been recorded in speculative store buffer 44. A store memory operation may be selected out of order if each previous load memory operation has been performed.

It is noted that a load memory operation may overlap a speculative store memory operation (i.e. access one or more bytes updated by the speculative store memory operation as well as one or more bytes not updated by the speculative store memory operation). In such a case, a portion of the data corresponding to the load memory operation is stored in speculative store buffer 44 and the remaining portion is stored in data cache 14 (or the main memory). Load/store unit 20 may stall such load memory operations until the speculative store memory operation is cancelled or completed into data cache 14 (or the main memory). The load memory operation may then access data cache 14 (or the main memory) to retrieve the corresponding data. Alternatively, the bytes updated by the store memory operation (from speculative store buffer 44) may be merged with the bytes not updated by the store memory operation (from data cache 14) to provide data for the load memory operation.

Figure 3:
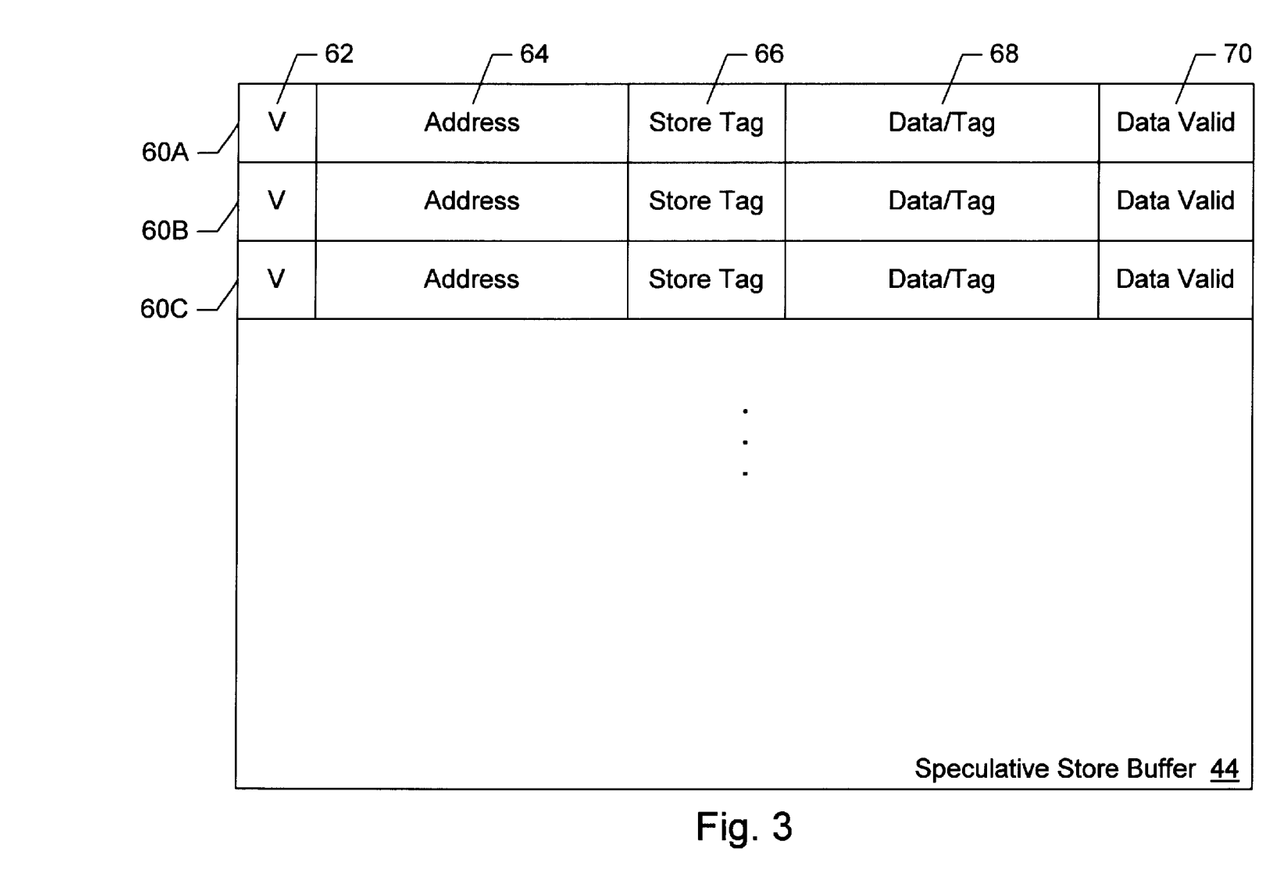
FIG. 3 is a block diagram of one embodiment of a speculative store buffer shown in FIG. 2.

It is noted that any number of memory operations may be concurrently selected and presented to data cache 14 and speculative store buffer 44, according to various embodiments. It is further noted that, although load/store buffer 40 is shown in FIG. 3, other embodiments may employ a separate load buffer and store buffer for storing load memory operations and store memory operations (respectively). It is further noted that store memory operations may be stalled until each prior load memory operation is serviced, in order to ensure that each load memory operation receives the correct store data.

Turning now to FIG. 3, a block diagram of one embodiment of store buffer 44 is shown. Other embodiments are possible and contemplated. As shown in FIG. 3, store buffer 44 includes a plurality of storage locations (e.g. storage locations 60A, 60B and 60C). Each storage location includes a valid bit 62, an address field 64, a store tag field 66, a data/tag field 68, and a data valid field 70 in the embodiment of FIG. 3.

Valid bit 62 indicates whether or not the storage location 60 is storing valid information (e.g. whether or not the storage location 60 is allocated to store the speculative state of a memory location). For example, if valid bit 62 is set, the storage location 60 may be allocated for storing the speculative state of a memory location. If valid bit 62 is clear, the storage location 60 may be free for allocation to a memory location.

Address field 64 stores the address of the memory location for which the storage location 60 is maintaining speculative state. Address field 64 is valid for comparison with the address upon cache access bus 50 if valid bit 62 is set.

Store tag field 66 stores the reorder buffer tag of the store memory operation corresponding to the speculative state stored in the storage location 60. Store tag field 66 can be compared to the store tag conveyed upon cache access bus 50 when a non-speculative store memory operation is conveyed. If the tag matches, then data cache 14 is being updated with the state stored in the storage location 60. Valid bit 62 may be reset, allowing the storage location 60 to be allocated to another memory location.

Data/tag field 68 stores the speculative state of the memory location addressed by the address stored in address field 64. If the store data has not yet been provided, data/tag field 68 stores the reorder buffer tag which will identify the store data upon result buses 30. If the store data has been provided, then data/tag field 68 stores the store data. Data valid field 70 indicates whether or not the data is valid. If the data is not valid, data/tag field 68 is storing a tag.

According to one particular embodiment, data/tag field 68 is configured to store a particular number of bytes. The number of bytes may be the largest number of bytes which may be updated by a single store memory operation. For example, the number of bytes may be 4 for an embodiment of microprocessor 10 employing the x86 microprocessor architecture. However, certain store memory operations may update 1 or 2 bytes, as opposed to 4. Data valid field 70 may therefore be configured with, for example, a bit for each byte of data/tag field 68. If each bit is reset, data/tag field 68 is storing a tag. If one or more bits are set, data/tag field 68 is storing data. Additionally, the bits which are set indicate which bytes of data/tag field 68 are storing valid data. For speculative store buffer 44 to forward data according to one embodiment, the valid bit for each byte requested by the load memory operation must be set.

Figure 4:
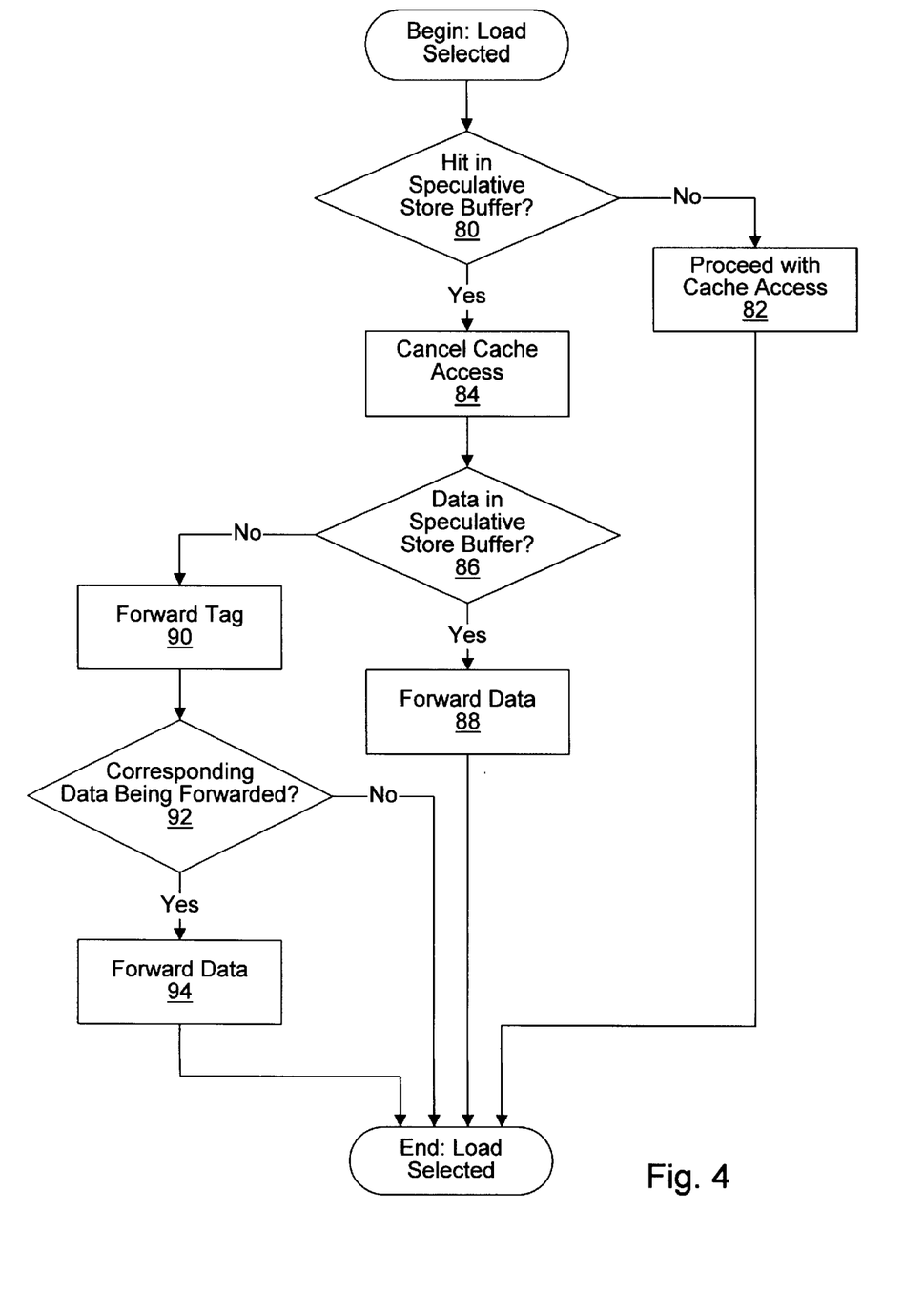
FIG. 4 is a flowchart illustrating operation of a load memory operation according to one embodiment of the load/store unit shown in FIG. 1.

Turning next to FIG. 4, a flowchart illustrating operation of portions of one embodiment of load/store unit 20 when a load memory operation has been selected from load/store buffer 40 is shown. When a load memory operation is selected, it is conveyed to speculative store buffer 44 and data cache 14. If the load memory operation is a miss in speculative store buffer 44 (decision block 80), the state of the memory location accessed by the load memory operation is non-speculative. Load/store unit 20 proceeds with a cache access to data cache 14 (step 82).

If, on the other hand, the load memory operation hits in speculative store buffer 44, the cache access to data cache 14 is cancelled (step 84). Cancelling of the cache access may be performed by conveying the hit signal to data cache 14 from speculative store buffer 44. Data cache 14 may use the hit signal and the indication of a load memory operation to inhibit the transfer of bytes from data cache 14.

Load/store unit 20 then determines if the hitting store buffer storage location is storing the store data or a tag identifying the store data (decision block 86). For example, the data valid field shown in FIG. 3 may be examined, according to one embodiment. If data is being stored, speculative store buffer 44 forwards the data (step 88). Conversely, if a tag is being stored, speculative store buffer 44 forwards the tag (step 90). Speculative store buffer 44 may be configured to signal, via result bus 30A, whether a tag or data is being forwarded. Additionally, if a tag is being forwarded, load/store unit 20 determines if the data corresponding to the tag is concurrently being forwarded (decision block 92). If the data is concurrently being forwarded, then the reservation station or reorder buffer receiving the forwarded tag may not capture the data (since the tag has not arrived at the reservation station or the reorder buffer yet). In this case, load/store unit 20 may forward the data (step 94). It is noted that the data may be forwarded in a subsequent clock cycle, if desired.

Figure 5:
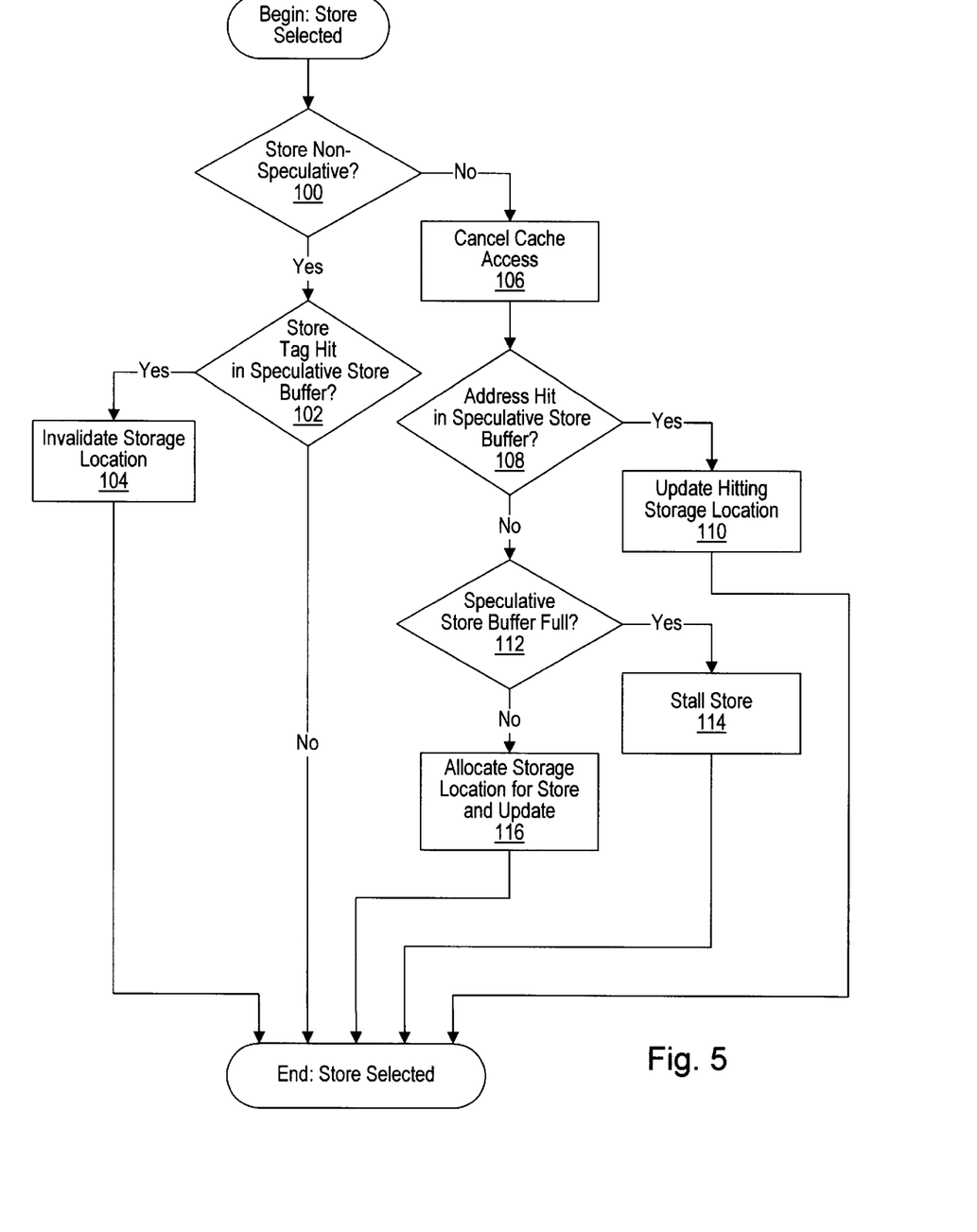
FIG. 5 is a flowchart illustrating operation of a store memory operation according to one embodiment of the load/store unit shown in FIG. 1.

Turning now to FIG. 5, a flowchart illustrating operation of portions of one embodiment of load/store unit 20 when a store memory operation has been selected from load/store buffer 40 is shown. Load/store unit 20 first determines if the store is speculative or non-speculative (decision block 100). If the store memory operation is non-speculative, speculative store buffer 44 determines if the store tag (the reorder buffer tag corresponding to the store memory operation) is a hit (decision block 102). If the store tag is a hit, the corresponding storage location is invalidated in speculative store buffer 44 (step 104). If the store tag is a hit, the memory location is being updated to the state indicated by the speculative store buffer storage location. Therefore, invalidating the storage location makes the storage location available for storing the speculative state of another memory location.

On the other hand, the store memory operation may be speculative. In this case, the cache access for the store memory operation is cancelled (step 106). Since the store memory operation is speculative, data cache 14 is not updated yet. The address corresponding to the store memory operation is searched in speculative store buffer 44 to determine if the address is a hit (decision block 108). If a hit is detected, the storage location which is hit is updated with the store data or tag for the store data (step 1 10). Conversely, if the store memory operation is a miss in speculative store buffer 44, load/store unit 20 determines if speculative store buffer 44 is full (i.e. each storage location therein is storing a speculative state for a memory location—decision block 112). If speculative store buffer 44 is full, a speculative state for the memory location corresponding to the store memory operation cannot currently be stored into speculative store buffer 44. The store memory operation may therefore be stalled until a storage location within speculative store buffer 44 is free (step 114). If speculative store buffer 44 is not full, a storage location is allocated to the memory location updated by the store memory operation, and store data or a corresponding tag is stored therein (step 116).

Figure 6:
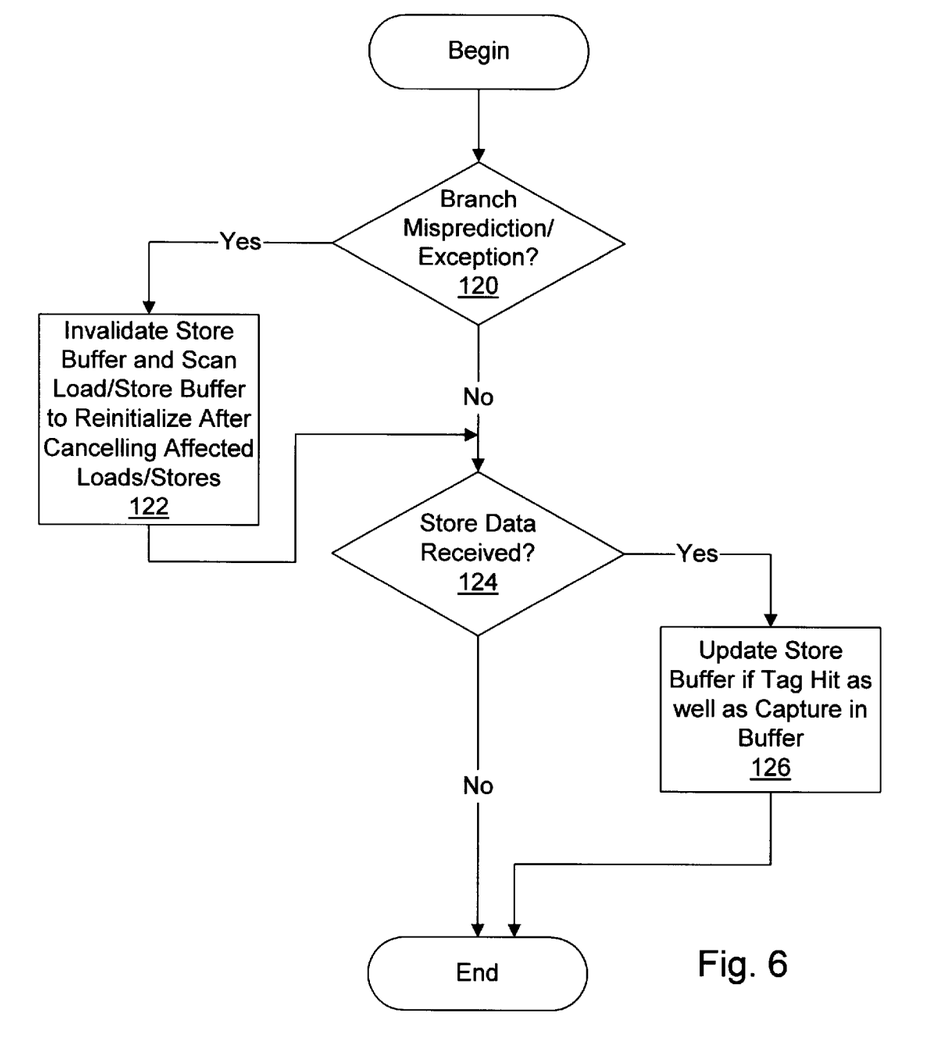
FIG. 6 is a flowchart illustrating other operations performed by one embodiment of the load/store unit shown in FIG. 1.

Turning next to FIG. 6, a flowchart illustrating certain other activities performed by one embodiment of load/store unit 20 in relation to speculative store buffer 44 is shown (i.e. activities not specifically related to the performance of a load or store memory operation are shown in FIG. 6). Load/store unit 20 determines if a branch misprediction or exception is being signalled by reorder buffer 22 (decision block 120). If a branch misprediction or exception is being signalled, load/store unit 20 invalidates speculative store buffer 44. Furthermore, after cancelling the affected load/store memory operations from load/store buffer 40 (i.e. the affected load/store memory operations are subsequent to the mispredicted branch instruction or the instruction experiencing the exception), load/store unit 20 scans load/store buffer 40 to create a new speculative state in speculative store buffer 44 (step 122). Load/store unit 20 may reset indications that store memory operations are recorded in speculative store buffer 44, for example, and then select load/store memory operations as described above.

Additionally, load/store unit 20 detects store data being received via result buses 30 (decision block 124). In addition to updating load/store buffer 40, load/store unit 20 updates speculative store buffer 44 if the tag corresponding to the store data is a hit in speculative store buffer 44 (step 126).

It is noted that the flowcharts shown herein have presented a series of steps. The ordering of the steps has been presented for ease of understanding. Other orderings of the steps may be used to accomplish the same results. Additionally, while steps may be shown in a serial fashion, the steps may actually be implemented in a more parallel fashion in combinatorial logic. It is further noted that the terms "hit" and "miss" have been used above in conjunction with speculative store buffer 44 and data cache 14. An access is a hit if the information requested in the access is stored in the accessed device (e.g. speculative store buffer 44 or data cache 14). An access is a miss if the information requested in the access is not stored in the access device.

Figure 7:
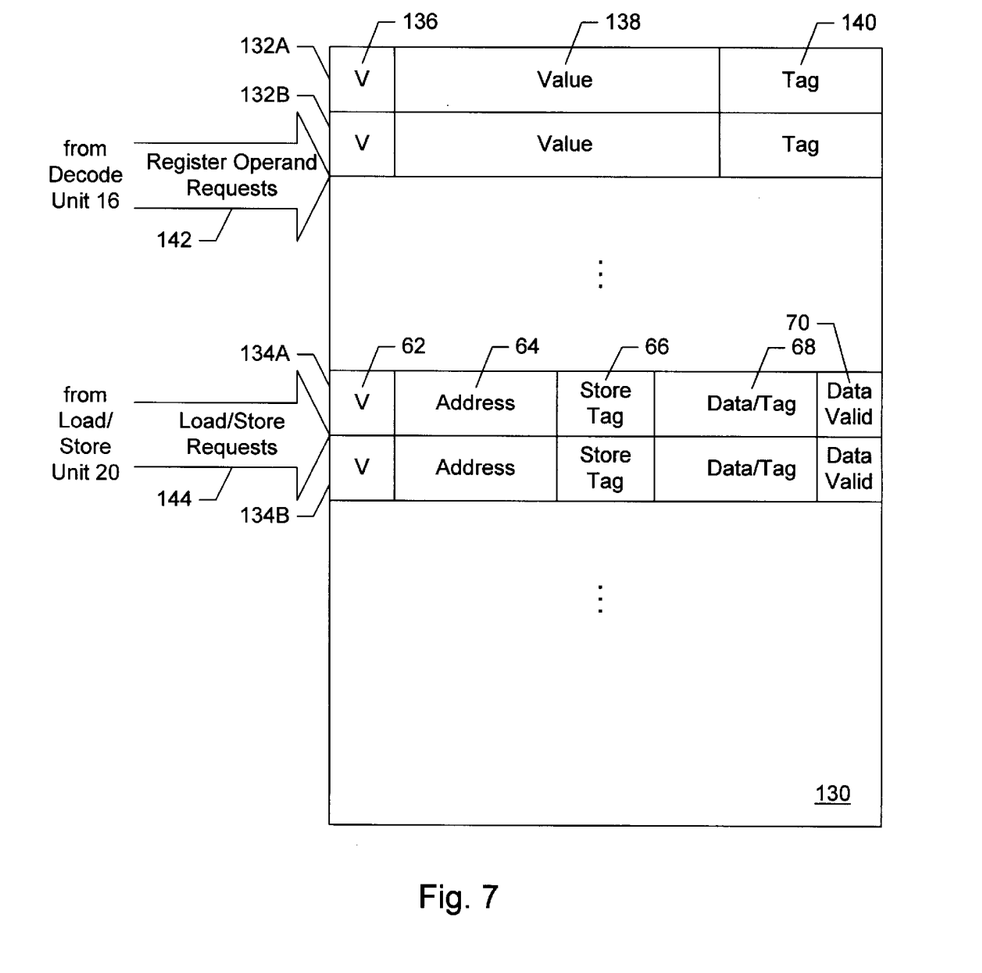
FIG. 7 is a block diagram of one embodiment of a combined future file/speculative store buffer.

Turning now to FIG. 7, a block diagram of one embodiment of a combined future file/speculative store buffer 130 is shown. Combined future file/speculative store buffer 130 includes a set of storage locations (e.g. storage locations 132A–132B) corresponding to registers within register file 24 as well as a second set of storage locations (e.g. storage locations 134A–134B) corresponding to memory locations. Storage locations 132A–132B may each comprise a valid bit 136, a value field 138, and a tag field 140, for example. Valid bit 136 may indicate the validity of value field 138 and tag field 140. Value field 138 may store the speculative state of the register value, and tag field 140 may store the reorder buffer tag corresponding to the most recent instruction to update the register. Storage locations 134A–134B may include fields 62–70 as shown in FIG. 3.

Storage locations 132A–132B may be accessed in response to register operand requests 142 from decode unit 16, while storage locations 134A–134B may be accessed in response to load/store requests 144 from load/store unit 20. By combining the register future file and the speculative store buffer, several additional advantages may be achieved. For example, in embodiments of microprocessor 10 in which a memory address for an instruction is generated prior to retrieving register operands for the instruction, the memory and register operands may be retrieved concurrently from combined future file/speculative store buffer 130. For load memory operations, the same operand buses used to forward other data may be used to forward the load data to reservation stations 17 and the result may be directly placed into the register portion of the future file.

Figure 8:
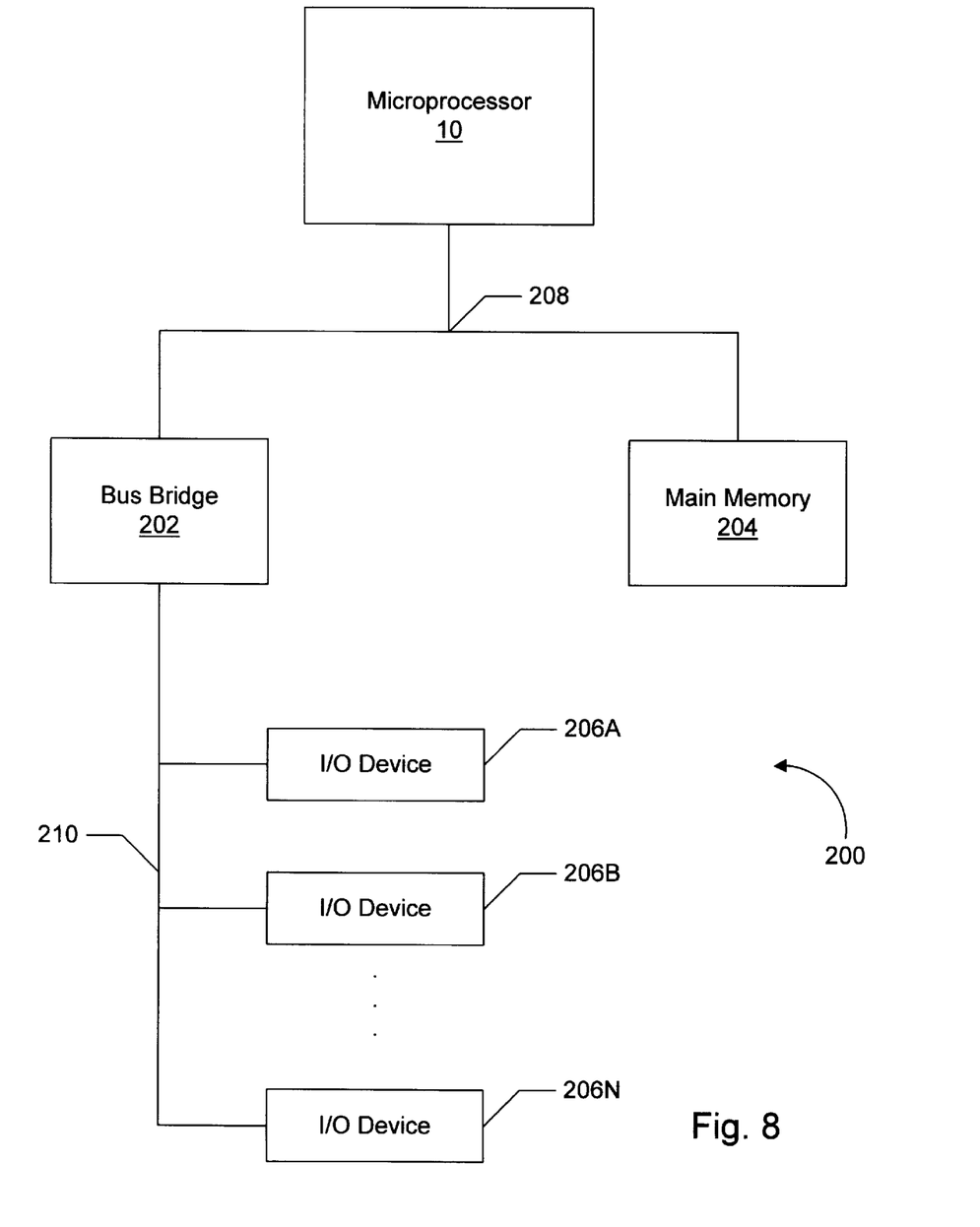
FIG. 8 is a block diagram of one embodiment of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

In accordance with the above disclosure, a microprocessor has been shown which achieves load/store dependency checking using a speculative store buffer. The speculative store buffer maintains a speculative state for one or more memory locations, allowing speculative load memory operations to access a storage location and retrieve the speculative state of the storage location directly. Advantageously, complex buffer compare logic, hit prioritization logic, and buffer forwarding logic may be eliminated in favor of the speculative store buffer. The dependency checking and forwarding may be accomplished more rapidly due to the simplifications achieved by employing the speculative store buffer.

Numerous variations and modifications will become apparent to those skilled in the art once the above disclosure is fully appreciated. It is intended that the following claims be interpreted to embrace all such variations and modifications.

What is claimed is:

1. A method for performing memory operations in a microprocessor comprising:
   storing at least a first data address corresponding to a first store memory operation in a speculative store buffer, said first store memory operation being speculative upon said storing;
   storing at least said first data address corresponding to said first store memory operation in a load/store buffer;
   accessing said speculative store buffer in response to a first load memory operation which is subsequent to said first store memory operation in program order;
   forwarding a value corresponding to said first store memory operation from said speculative store buffer if a second data address corresponding to said first load memory operation matches said first data address; and
   reading said first data address from said load/store buffer and updating said data cache responsive to said first store memory operation becoming non-speculative.

2. The method as recited in claim 1 wherein said storing comprises storing a first tag identifying a source for a first store data corresponding to said first store memory operation in said speculative store buffer if said first store data has not yet been received in said buffer.

3. The method as recited in claim 2 wherein said value comprises said first tag if said first store data has not been provided upon said accessing.

4. The method as recited in claim 2 wherein said storing further comprises updating said speculative store buffer with said first store data upon said first store data being provided.

5. The method as recited in claim 4 wherein said value in said forwarding comprises said first store data if said first store data has been provided upon said accessing.

6. The method as recited in claim 1 further comprising replacing said value corresponding to said first store memory operation within said speculative store buffer with a second value corresponding to a second store memory operation which is speculative, said second store memory operation being subsequent to said first store memory operation in program order.

7. The method as recited in claim 6 wherein said replacing comprises storing a second tag identifying a source for a second store data corresponding to said second store memory operation in said speculative store buffer.

8. The method as recited in claim 7 further comprising forwarding said second tag in response to a second load memory operation subsequent to said second store memory operation in program order.

9. The method as recited in claim 8 further comprising updating said speculative store buffer with said second data.

10. The method as recited in claim 9 further comprising forwarding said second data in response to said second load memory operation if said second data is provided to said speculative store buffer prior to accessing said speculative store buffer in response to said second load memory operation.

11. A load/store unit comprising:
    a speculative store buffer configured to store a speculative state of a memory location;
    a control unit coupled to said speculative store buffer, said control unit configured to establish said speculative state in response to a first speculative store memory operation to said memory location, and wherein said control unit is further configured to update said speculative state of said memory location in response to a second speculative store memory operation to said memory location; and
    a load/store buffer configured to store said first speculative store memory operation and said second speculative store memory operation, wherein said load/store buffer is configured to convey said first speculative store memory operation to a data cache upon receiving an indication that said first speculative store memory operation is non-speculative, and wherein said load/store buffer is configured to convey said second speculative store memory operation to said data cache upon receiving an indication that said second speculative memory operation is non-speculative.

12. The load/store unit as recited in claim 11 wherein said speculative state comprises, prior to updating said speculative state in response to said second speculative store memory operation, a tag identifying a source of store data corresponding to said first speculative store memory operation if a first store data corresponding to said first speculative store memory operation has not been provided.

13. The load/store unit as recited in claim 12 wherein said speculative store buffer is configured to monitor a plurality of result buses for said tag.

14. The load/store unit as recited in claim 13 wherein said speculative store buffer is configured to update said speculative state with said first store data upon detecting said tag upon one of said plurality of result buses.

15. The load/store unit as recited in claim 11 wherein said speculative store buffer is further configured to forward said speculative state in response to a load memory operation to said memory location.

16. A microprocessor comprising:

a load/store unit including a speculative store buffer configured to store a speculative state of at least one memory location, wherein said load/store unit further includes a load/store buffer, wherein said load/store unit is configured to establish said speculative state in response to a first store memory operation to said at least one memory location and to update said speculative state in response to a second store memory operation to said at least one memory location, and wherein said speculative store buffer is configured to forward said speculative state in response to a load memory operation to said at least one memory location, wherein said load/store buffer stores a first store address and a first store data and is configured to transmit said first store address and said first store data in response to said first store memory operation becoming non-speculative; and a data cache coupled to said load/store unit, wherein said data cache is configured to store a non-speculative state of said at least one memory location, and wherein said data cache is further configured to forward said non-speculative state in response to said load memory operation if said speculative store buffer is not storing a speculative state corresponding to said load memory operation, wherein said data cache is coupled to receive said first store address and said first store data in response to said first store memory operation becoming non-speculative and to update said at least one memory location.

17. The microprocessor as recited in claim 16 wherein said speculative state comprises a tag identifying a source of store data corresponding to said at least one memory location.

18. The microprocessor as recited in claim 17 further comprising a reservation station coupled to receive said tag and to monitor a plurality of result buses for said tag in order to receive said store data.

* * * * *